United States Patent [19]

Schulz et al.

[11] 4,360,639

[45] Nov. 23, 1982

[54] POLY-2-ISOPROPENYLNAPHTHALENE POLY-BUTADIENE-1,3-BLOCK COPOLYMERS AND METHOD FOR THEIR PRODUCTION

[75] Inventors: Rolf C. Schulz, Mainz; Dieter Engel, Kelsterbach, both of Fed. Rep. of Germany

[73] Assignee: Bergwerksverband GmbH, Essen, Fed. Rep. of Germany

[21] Appl. No.: 328,093

[22] Filed: Dec. 7, 1981

[30] Foreign Application Priority Data

Dec. 5, 1980 [DE] Fed. Rep. of Germany ....... 3045807

[51] Int. Cl.$^3$ ............................................ C08F 297/04
[52] U.S. Cl. .................................... 525/289; 525/314
[58] Field of Search .................. 525/289, 314; 526/284

[56] References Cited

U.S. PATENT DOCUMENTS

| | | | |
|---|---|---|---|
| 3,164,575 | 1/1965 | Welch | 526/284 |
| 3,202,642 | 8/1965 | Hardy | 526/181 |
| 4,168,286 | 9/1979 | Moczygemba | 525/289 |

*Primary Examiner*—Paul R. Michl
*Attorney, Agent, or Firm*—Michael J. Striker

[57] ABSTRACT

Poly-2-isopropenylnaphthalene-poly-butadiene-1,3-block copolymers and method for their production. Di- or tri-block polymers with molecular weights of at least 10,000 are formed from, respectively, a poly-2-isopropenylnaphthalene block and a poly-butadiene-1,3 block, and a poly-2-isopropenylnaphthalene block and a poly-butadiene-1,3 block as well as a further poly-2-isopropenylnaphthalene block. The products display rubber-elastic characteristics of the known block polymerizates, with improved high-temperature stability. The polymers are formed by reacting 2-isopropenylnaphthalene in an inert, aliphatic or cycloaliphatic hydrocarbon solvent, at low temperature, with alkalimetal, alkalimetalalkylene, -arylene or -hydride catalyst, into a poly-2-isopropenylnaphthalene block. This formed polymeric anion then has poly-butadiene-1,3-block added to it at its active chain end. If necessary, a second poly-2-isopropenylnaphthalene block is added. The reaction becomes terminated in known manner through the addition of water, alcohol or acid. Lithium-alkyl is the preferred catalyst; tetrahydrofuran is the preferred solvent; the reaction is performed at temperatures between 0° and −80° C., preferably between about −50° C. and −80° C. It is also preferred to initially provide the 2-isopropenylnaphthalene in the solvent at about 0° to 5° C.

10 Claims, No Drawings

POLY-2-ISOPROPENYLNAPHTHALENE POLY-BUTADIENE-1,3-BLOCK COPOLYMERS AND METHOD FOR THEIR PRODUCTION

BACKGROUND OF THE INVENTION

The invention concerns block polymers of poly-2-isopropenylnaphthalene and polybutadiene-1,3, and methods for their production.

It is already known that 2-isopropenylnaphthalene can be anionically polymerized in a solvent, such as for example tetrahydrofuran, in the presence a catalyst from the series of alkalimetals, alkalimetalalkyls,-aryls or -hydrides, at temperatures between 0° and −80° C. Depending on reaction conditions, homopolymerisates of different molecular weights can be so obtained. (Macromol. Chem. 62 (1963) p. 31.)

It is further known that one can obtain homopolymerisates of 2-isopropenylnapthalene, by reacting the monomer with alkalimetal-catalysts in an inert organic solvent, for example with sodium dispersed in benzene, at 3° C. After termination of the reaction through the addition of methanol, homopolymers with a molecular weight of 100,000 and a softening range from 250°–280° C. are obtained. (U.S. Pat. No. 3,202,642.) It is moreover known to perform an anionic copolymerisation of 2-isopropenylnaphthalene with unsaturated compounds, for example styrene, under the same conditions.

Finally, it is also indeed known, that copolymers composed of 2 blocks are obtained when one allows n-butyllithium to act upon a solution of butadiene and styrene in aliphatic hydrocarbons. Herewith only the butadiene is reacted initially, and subsequently the styrene in added at the active chain end. The polymeric anion formed in the interim is characterized as a so-called "living" polymer. After termination of the reaction a copolymerisate is isolated, which displays structural blocks of poly-butadiene and poly-styrene. (Runge and Taeger, "Chemie und Technologie der Kunststoffe" Akademie-Verlag, Berlin 1976, page 478) In another manner a copolymer composed of 3 blocks can also be produced, by initially producing a poly-styrene block, adding to this a poly-butadiene block, and subsequently attaching a further poly-styrene block. This tri-block copolymer displayed already in unvulcanized condition at normal temperature, rubber/elastic characteristics.

A disadvantage of the known block polymers is the comparatively low high-temperature stability.

SUMMARY OF THE INVENTION

It is therefore an object of the present invention to prepare a block polymer, in particular a tri-block polymer, which has improved high-temperature stability in relation to the known tri-block polymers, in particular the SBS polymer of Runge and Taeger.

It is a further object of the invention to produce new block copolymers of 2-isopropenylnaphthalene with butadiene-1,3, having a molecular weight of at least 10,000.

These objects are attained according to the present invention by producing in analogous manner of operation as with the known block polymerisates, such a di- or tri-block polymer, which possesses at least one block of poly-2-isopropenylnaphthalene (poly-2-IPN), the other blocks of which can be composed of all known homopolymerisates, suitable for such block polymerisation, such as e.g. poly-butaldiene. For the production of the poly-2-IPN-block one proceeds in a manner already known (Macrom. Chem., volume 62, 1963, page 31), i.e. the 2-IPN is joined with a solvent, which is an inert, aliphatic or cycloaliphatic hydrocarbon; at temperatures of at most 5° C., preferably less than 0° C.; the polymerisation follows with the aid of a catalyst, for which alkalimetal, alkalimetalalkylene, -arylene, or -hydride is used. The polymerization occurs at a lowest temperature of about −80° C., whereby it is recommended to start the reaction at the mentioned temperature of below 5° C., preferably below 0° C., and to undertake the cooling down first after green coloration of the solution takes place, since the start of the reaction at the lowest polymerization temperature is kinetically unfavorable. After conclusion of this block polymerization, the polymerization of the other monomer can follow. That is, e.g. a butadiene-1,3-block is added to the formed polymeric anion. Later on, again under the mentioned conditions, a further poly-2-IPN block may be added. It is also possible to proceed the other way around, initially producing the other homopolymer block, and under the given conditions then polymerizing the poly-2-IPN-block, and after that again adding a third block of the first-mentioned type. The reaction is terminated in known manner through the addition of water, alcohol or acid.

It was discovered in surprising manner that also 2-isopropenylnaphthalene forms so-called living polymers when one reacts it at low temperature in a solvent, such as for example tetrahydrofuran, with lithium-alkyl. In this manner a polymeric anion is formed, to which further monomers may be added, so that after termination of the reaction block copolymerisates with 2 or 3 blocks are obtained.

According to the present invention, block-copolymerisates are produced for the first time, which contain a block of poly-2-isopropenylnaphthalene.

In this manner according to the present invention new di-block polymers with a molecular weight of at least 10,000 are produced, which are formed from a poly-2-isopropenylnaphthalene block and a poly-butadiene-1,3 block, or tri-block polymers with a molecular weight of at least 10,000, which are formed from a poly-2-isopropenylnaphthalene block and a poly-butadiene-1,3-block, as well as a further poly-2-isopropenylnaphthalene block.

The tri-block copolymers likewise display rubber-elastic characteristics, with a determined molecular weight composition controllable through the polymerization. Based upon relatively high glass temperature of 220° C. of poly-2-isopropenylnaphthalene, the tri-block polymers produced with 2-isopropenylnaphthalene also remain rubber-elastic at temperatures above 100° C. (the glass temperature of poly-styrene.)

Through the block polymers according to the present invention, the characteristics offered by the previously known block copolymers are enlarged in advantageous manner. The installation of the naphthalene rings bestows upon the polymers special characteristics, for example an improved heat stability. For this reason, the thermal plastic products can be used for all purposes where higher thermal demands are placed on the materials.

The advantage of the new substances is that they possess actual rubber-elastic characteristics, such as the known block polymerisates, but beyond that display a clearly improved high-temperature stability.

A typical utility for such products is e.g. with the encasing of electrical cables and the like, and always then when rubber-elastic characteristics must be connected with good temperature stability.

As is the case with other so-called living polymers, it is necessary to proceed in a very careful manner of operation for the production of the new block copolymers according to the present invention, in order to obtain an undisturbed growth of the living polymer from poly-2-isopropenylnaphthalene. In particular, moisture and oxygen must be strictly excluded. Moreover, the comonomer must be highly purified.

As catalyst, all alkalimetal compounds known for use with anionic polymerization, as well as the alkalimetals alone are suitable. Above all, the lithium alkyls, for example sec. butyl-lithium and n-butyl-lithium, are approved.

As solvent, use may be made of inert aliphatic or cycloaliphatic, still liquid at the low polymerization temperature conditions, hydrocarbons, or ethers, for example tetrahydrofuran.

The preferred temperature range for the polymerization lies between 0° and −80° C. and indeed in particular between −50° and −80° C. The polymerization is terminated through the addition of water, alcohol or acid.

The molecular weights of the produced block-copolymers can be optionally adjusted through the choice of the catalyst concentration, for example between 10,000 and 70,000 with di-block polymers, and between 90,000 and 150,000 with tri-block polymers, while their compositions may likewise be adjusted through alteration of the individual portions of monomer.

The novel features which are considered as characteristic for the invention are set forth in particular in the appended claims. The invention itself, however, both as to its construction and its method of operation, together with additional objects and advantages thereof, will be best understood from the following description of specific embodiments.

DESCRIPTION OF THE PREFERRED EMBODIMENTS

EXAMPLE 1

In a reactor, 100 parts by weight of tetrahydrofuran, distilled and de-gased over potassium and n-butyllithium, are provided with 10 parts by weight monomeric 2-isopropenylnaphthalene, distilled across sodium.

The homopolymerization of the 2-isopropenylnaphthalene is then started at 0° C. through the addition 0.14–0.2 parts by weight of a 15% solution of n-butyl-lithium in n-hexane. The amount of the added catalyst is adjusted according to the desired molecular weight of the polymer to be produced.

After the mixture becomes colored a deep dark green, it is cooled down to about −78° C., and after about two hours the iso-propenylnaphthalene is completely polymerized. Then 11 parts by weight of purified butadiene-1,3 are distilled into the "living" solution of the poly-2-isopropenylnaphthalene.

After a further 2 hours, termination of the polymerization follows through the addition of 1 part by weight methanol. Then, by dripping into the reaction solution 2,000 parts by weight methanol, the di-block polymer of the type poly-2-isopropenylnapthalene-poly-butadiene-1,3 is obtained.

In the same manner, altered ratio amounts of a di-block polymer with another molecular weight distribution are produced.

| Product No. | $M_w^{(1)}$ | $M_n^{(2)}$ | $M_w/M_n$ | % Butadiene-1,3 |
|---|---|---|---|---|
| 1 | 31,400 | 29,370 | 1,069 | 77 |
| 2 | 62,750 | 58,940 | 1,065 | 78 |

$^{(1)}M_w$ = weight average of molecular weight
$^{(2)}M_n$ = number average of molecular weight F. W. Billmeyer, Textbook of polymerscience, Interscience-Publisher 1964/z.Ed. s. 56/66

The molecular weights and their distribution are determined with the aid of gel permeation chromatography. Through electron microscopy, the block-structures are established. The glass temperature of the polybutadiene-1,3-blocks amounts to about −5° C. It is thermogravimetrically determined, to the extent that no stabilizer is added, that from about 180° oxidation of the butadiene, and from about 285° C. depolymerization take place.

EXAMPLE 2

In a closed reactor, 100 parts by weight of toluene distilled over potassium and n-butyl-lithium, are provided together with 10 parts by weight of 2-isopropenylnaphthalene, distilled over sodium, and 15 parts by weight of butadiene-1,3, at −4° C.

The reactor is heated to 45° C., and the polymerization of the butadiene-1,3 is started through the addition of 0.14–0.2 parts by weight of a 15% n-butyl-lithium solution in n-hexane. Within 1 to 2 hours, polymerization of the butadiene-1,3 is complete, whereas only less than 2% by weight 2-isopropenylnaphthalene becomes inserted into the polymer.

The polymerization is then activated through the addition of 0.2–0.3 parts by weight tetrahydrofuran, and is perceptible through a color change from light yellow to dark green to dark brown. After the color change, the mixture is cooled down to about −30° C. and the 2-isopropenylnapthalene polymerized for a further 2 to 10 hours. Termination of the reaction follows through the addition of 1 part by weight methanol, and the di-block polymer is obtained upon the addition of 2,000 parts by weight of methanol.

| Product No. | $M_w$ | $M_n$ | $M_w/M_n$ | % Butadiene |
|---|---|---|---|---|
| 1 | 10,510 | 10,020 | 1.05 | 91 |

EXAMPLE 3

The polymerization of 3.36 parts by weight 2-isopropenylnapthalene in 50 parts by weight tetrahydrofuran is started, in the manner described in Example 1, with 0.1 parts by weight of a 15% solution of n-butyl-lithium in n-hexane.

After about 2 hours, 10 parts by weight butadiene-1,3 are distilled into the "living" solution and subsequently polymerized for about 2 hours at about 20° C.

After complete polymerization of the butadiene-1,3, 3.36 parts by weight of 2-isopropenylnaphthalene in 50 parts by weight tetrahydrofuran are added, and polymerization is renewed at −78° C.

With this manner of operation, it is guaranteed that the poly-2-isopropenylnaphthalene-block will be symmetrical. After termination of the reaction with methanol, the product is then obtained in methanol, as described in Example 1.

| Product No. | $M_w$ | $M_n$ | $M_w/M_n$ | % Butadiene-1,3 |
|---|---|---|---|---|
| 4 | 94,560 | 87,030 | 1.086 | 80 |
| 5 | 118,470 | 103,370 | 1.15 | 71 |
| 6 | 104,230 | 91,720 | 1.13 | 60 |
| 7 | 141,970 | 113,800 | 1.25 | 78 |

| Product No. | Breaking tension ($kgmm^{-2}$) (measured for a film of the polymer) | Thickness[1] ($\mu m$) | Relative Elongation ($\Delta l/l$) (measured for a film of the polymer) |
|---|---|---|---|
| 4 | 3.0 | 125 | 11.7 |
| 5 | 1.7 | 115 | 11.6 |
| 6 | 2.6 | 95 | 10.4 |
| 7 | 0.8 | 106 | 13.0 |

[1] broadness 4 mm

It will be understood that each of the elements described above, or two or more together, may also find a useful application in other types of polymerizations differing from the types described above.

While the invention has been illustrated and described as embodied in poly-2-isopropylnaphthalene-polybutadiene-1,3-block copolymers and a method for their production, it is not intended to be limited to the details shown, since various modifications and structural changes may be made without departing in any way from the spirit of the present invention.

Without further analysis, the foregoing will so fully reveal the gist of the present invention that others can, by apply current knowledge, readily adapt it for varous applications without omitting features, that from the standpoint of prior art, fairly constitute essential characteristics of the generic or specific aspects of this invention.

What is claimed as new and desired to be protected by Letters Patent is set forth in the appended claims:

1. Block copolymer composed of poly-2-isopropenylnaphthalene and poly-butadiene-1,3, with a molecular weight of at least 10,000.

2. Di-block polymer according to claim 1, with a molecular weight of at least 10,000, formed from a poly-2-isopenylnaphthalene block and a poly-butadiene-1,3-block.

3. Tri-block polymer according to claim 1, with a molecular weight of at least 10,000, formed from a poly-2-isopenylnaphthalene block and a poly-butadiene-1,3 block, as well as a further poly-2-isopropenylnaphthalene block.

4. Method for the production of a block copolymer composed of poly-2-isopropenylnaphthalene and poly-butadiene-1,3 according to claim 1, comprising reacting 2-isopropenylnaphthalene, in inert, aliphatic or cycloaliphatic hydrocarbon solvent, at low temperature, with alkalimetal, alkalimetalalkylene, -arylene or -hydride catalyst, into a poly-2-isopropenylnapthalene block, and adding to the so-formed polymeric anion a poly-butadiene-1,3-block at its active chain end, the reaction being terminated through the addition of water, alcohol or acid.

5. Method for the production of a block copolymer according to claim 4, further comprising after adding to the formed polymeric anion a poly-butadiene-1,3 block, adding a second poly-2-isopropenylnaphthalene block.

6. Method according to claim 4, wherein lithiumalkyl is used as catalyst.

7. Method according to claim 4, wherein tetrahydrofuran is used as solvent.

8. Method according to claim 4, performed at temperatures between about 0° and −80° C.

9. Method according to claim 7, performed at temperatures between about −50° C. and −80° C.

10. Method according to claim 8, further comprising initially providing said 2-isopropenylnaphthalene in said solvent at about 0° to 5° C.

* * * * *